US007839573B2

(12) United States Patent
Wippermann et al.

(10) Patent No.: US 7,839,573 B2
(45) Date of Patent: Nov. 23, 2010

(54) DEVICE FOR HOMOGENIZING RADIATION BY MEANS OF IRREGULAR MICROLENS ARRAYS

(75) Inventors: Frank Wippermann, Jena (DE); Andreas Bräuer, Schloben (DE); Peter Schreiber, Jena (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 43 days.

(21) Appl. No.: 12/444,718

(22) PCT Filed: Oct. 5, 2007

(86) PCT No.: PCT/EP2007/008676

§ 371 (c)(1),
(2), (4) Date: Apr. 8, 2009

(87) PCT Pub. No.: WO2008/043491

PCT Pub. Date: Apr. 17, 2008

(65) Prior Publication Data
US 2010/0033829 A1 Feb. 11, 2010

(30) Foreign Application Priority Data
Oct. 10, 2006 (DE) .................. 10 2006 047 941

(51) Int. Cl.
G02B 27/10 (2006.01)
G02B 13/08 (2006.01)
(52) U.S. Cl. .................. 359/619; 359/623; 359/668
(58) Field of Classification Search .......... 359/619, 359/621–623, 624, 626, 628, 668, 671
See application file for complete search history.

(56) References Cited

U.S. PATENT DOCUMENTS

| 4,912,331 | A | 3/1990 | Owers |
| 6,069,739 | A | 5/2000 | Borodovsky |
| 6,262,423 | B1 | 7/2001 | Hell |
| 7,009,789 | B1 | 3/2006 | Brown |
| 7,085,062 | B2 * | 8/2006 | Hauschild .................. 359/626 |
| 2006/0209310 | A1 | 9/2006 | Muenz |
| 2007/0223095 | A1 | 9/2007 | Brown |

FOREIGN PATENT DOCUMENTS

DE 19623749 A1 5/1997

(Continued)

OTHER PUBLICATIONS

Christophe Kopp et al: "Efficient beamshaper homogenizer design combining diffractive optical elements, microlens array and random phase plate" Journal of Optics. A, Pure and Applied Optics, Institute of Physics Publishing, Bristol,, GB, vol. 1, Nr. 3, pp. 398-403, May 1, 1999.

(Continued)

*Primary Examiner*—Alicia M Harrington
(74) *Attorney, Agent, or Firm*—Matthew B. Dernier, Esq.; Gibson & Dernier LLP

(57) ABSTRACT

A device for the homogenization of radiation, preferably light, using chirped microlens arrays (cMLA) from the established regular microlens arrays (rMLA), chirped microlens arrays are an arrangement of non-identical lenses in one array. Non-identical means that the lens parameters of the lenses of the array, such as e.g. the radius of curvature, the free diameter, vertex position, and others, can vary from lens to lens or cell to cell. The parameters of each lens or cell can be determined by functions (analytically, numerically), the functions preferably being dependent upon the position of the cell or the lens in the array.

42 Claims, 13 Drawing Sheets

FOREIGN PATENT DOCUMENTS

| | | |
|---|---|---|
| DE | 19653413 A1 | 6/1998 |
| DE | 10108637 A1 | 9/2001 |
| WO | 02052335 A2 | 7/2002 |
| WO | 03048839 A | 6/2003 |
| WO | 2006023180 A | 3/2006 |

OTHER PUBLICATIONS

Schreiber P ft al: "Homogeneous LED—illumination using microlens arrays" Proceedings of the SPIE, SPIE, Bellingham, VA, US, vol. 5942,pp. 1-9, Aug. 20, 2005.

International Search Report for corresponding PCT application PCT/EP2007/008676, dated Feb. 12, 2008.

Written Opinion for corresponding PCT application PCT/EP2007/008676, dated Apr. 28, 2008.

International Preliminary Report on Patentability for corresponding PCT application PCT/EP2007/008676, dated May 5, 2009.

German Office Action for corresponding DE 102006047941.6, dated Jun. 13, 2007.

* cited by examiner

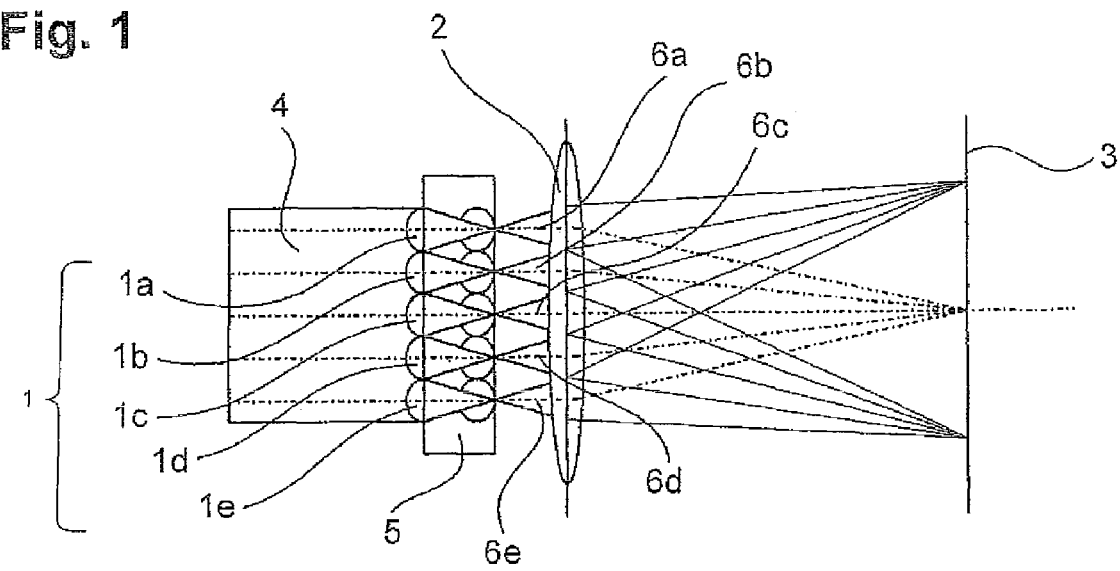
Fig. 1
State of the art
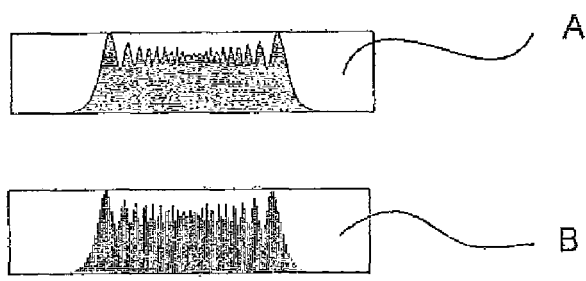

DEVICE FOR HOMOGENIZING RADIATION BY MEANS OF IRREGULAR MICROLENS ARRAYS

FIELD OF THE INVENTION

The invention relates to a device for the homogenisation of radiation, preferably light, using chirped microlens arrays (cMLA). Differing from the established regular microlens arrays (rMLA), chirped microlens arrays are an arrangement of non-identical lenses in one array. Non-identical means that the parameters of the lenses of the array, such as e.g. the radius of curvature, the free diameter, vertex position and others, can vary from lens to lens or cell to cell. The parameters of each lens or cell can be determined by functions (analytically, numerically), the functions preferably being dependent upon the position of the cell or the lens in the array.

BACKGROUND

According to the state of the art, a range of possibilities exists for homogenising light. Thus for example the use of a refractive beam-forming element is known. A refractive element adapted to the surface shape hereby deflects proportions of the incident radiation in such a manner that the desired intensity distribution is produced in the homogenisation plane. It is problematic with devices of this type that a change in the intensity distribution at the input leads directly to a change in the intensity distribution at the output, i.e. in the homogenisation plane. As a result, the adjustment of devices of this type is critical, i.e. the installed position with respect to incident radiation directly influences the output distribution. In addition, even small impurities have great influence on the beam formation. Furthermore, devices of this type are suitable only for homogenisation of light bundles with a small diameter (less than 1 mm) and are complex in production.

Also the use of diffractive beam-forming elements or computer-generated holograms (CGH) are known for homogenisation of radiation. A bending phase element hereby bends power proportions of the incident radiation in such a manner that the desired beam profile is produced in the homogenisation plane. Such elements show great wavelength dependency as a result of the diffractive effect. Furthermore, the efficiency is dependent upon the number of height steps (discretisation) and the relief of the surface leads to an increased scattered light proportion.

In the context of the present invention, above all the so-called Fly's Eye condensers (FEC) are of interest. Such Fly's Eye condensers have, according to the state of the art, a regular microlens array (rMLA). The incident radiation impinges on this microlens array so that the lenses thereof focus the radiation. The maximum angle of the focused radiation thereby depends upon the numerical aperture (NA) of the lenses. Behind the focus of the lenses individual radiation bundles run divergently away from each other, the angle of divergence corresponding to the numerical aperture of the lenses. In the beam path behind the microlens array, a Fourier lens is now disposed, which deflects the individual bundles in such a manner that the partial beams produced by the individual microlenses of the microlens array are situated one above the other in the focal plane of the Fourier lens. Since all power proportions which run through individual lenses are superimposed on the same surface in the focal plane, the radiation is homogenised. The degree of homogenisation is thereby dependent upon the number of individual lenses. If the number of individual lenses is chosen to be sufficiently large, then the homogenisation is virtually independent of the input intensity distribution. However it is a condition that the numerical aperture of the incident radiation corresponds at most to that of the lenses. The extension of the homogeneously illuminated surface in the focus of the Fourier lens is determined by the numerical aperture of the lenses and the focal distance of the Fourier lens. The envelopes of the intensity distributions in the focal plane of the Fourier lens are the same when using an array of identical lenses (regular array) and an individual lens. When using an array of identical lenses, interference effects occur however in addition, said effects leading to a further intensity modulation with the occurrence of intensity maxima and zero positions of the intensity and hence to an impairment in homogeneity.

The spatial distance of the hereby occurring intensity maxima in particular is inversely proportional to the width of the individual lenses. This means that using smaller lenses leads to large spacings of the intensity maxima and hence to less homogeneity. On the other hand, also the use of the larger lenses however leads to an impaired homogeneity and to a greater dependency of the intensity distribution upon the input intensity distribution with an assumed constant width of the input intensity distribution.

In the previously mentioned technology, a modulation of the intensity distribution always occurs in the focus of the Fourier lens. This means that the intensity over the homogenisation surface is subjected to regular variations and drops away relatively gently at the edge. This modulation can be avoided if, parallel to the above-described first regular microlens array, an identical second regular microlens array is disposed. In the case of an individual lens, a very homogeneous distribution with a steep edge drop is consequently achieved. In the case of a large number of lenses (lens arrays), the above-described interference problems however occur in the same way.

SUMMARY OF THE INVENTION

Starting from the state of the art, it is therefore the object of the present invention to indicate a device with which radiation can be homogenised, extensively independently of the input intensity distribution, as uniformly as possible, in particular without the superimposition of regular interference patterns.

The kernel of the present invention is to dispose a large number of lens systems with parallel optical axes, the lens systems being at least partially non-identical and the non-identical lens systems having the same numerical aperture in a first direction parallel to the main plane of the lens systems. In the simplest case, each of these lens systems is a microlens so that the lens arrangement with the large number of lens systems is a microlens array. According to the invention, also a lens system can have however two microlenses which are disposed with parallel or coinciding optical axes in succession. Such a lens system then has a resulting focal point, a resulting main plane and a resulting numerical aperture. If a large number of such lens systems are combined to form a lens arrangement, then the microlenses situated foremost in the direction of the radiation form a first microlens array and the microlenses situated therebehind in the direction of the radiation form a second microlens array.

For any lens or any lens system, the numerical aperture can be different in different directions. For the present invention it is initially only required that the numerical aperture is the same for all lenses in a specific direction. The numerical aperture in another direction can initially be arbitrary. Furthermore, also lens arrangements are according to the invention however in which the numerical aperture is the same also for all lenses in a direction perpendicular to the above first direction. The numerical apertures in the first and the second direction need not be identical, however they can be so for some embodiments.

In the case of the microlens arrays and/or lens arrangements present in the invention, the main planes of the microlenses or lens systems can be situated on a common surface. This surface can be a plane but it can also be spherical, aspherical, toroidal or be freely-formed. Preferably, the parameters of the lenses or lens systems, such as e.g. their numerical aperture, their focal distance, their dimensions, radius of curvature, their free diameter and/or their vertex position, are not chosen randomly but given by a function which is dependent upon the position of the lens system in the lens arrangement or the microlens array. Such a function can be an analytical or numerical function. It can be constant or monotonic, implicit or explicit or it can be a linear, quadratic, cubic, polynomial or transcendental function. Basically all types of functions are possible. The functions are hereby preferably dependent upon the concrete geometry of the arrangement so that parameters of the lenses are dependent for example upon the radius of curvature of the surface in the case of accommodation on a toroidal surface or e.g. the enclosed angle in the case of using two substrates.

For as good as possible homogenisation of the radiation, it is advantageous if the microlenses or lens systems cover as completely as possible the surface of the microlens array or the lens arrangement. If complete covering is not possible because of the geometry of the lenses, then the aim is to maximise the covering.

According to the invention, the microlenses used can have a range of different geometries. These geometries are presented in the following, all lenses on a given microlens array in a given lens arrangement or a lens system being able to have the same shape in the case of possibly different dimensions, or lenses with different shapes being able to be combined. In the simplest case, the lenses are axially symmetrical about their optical axis and/or have a circular circumference in the plane of the microlens array. Such lenses can for example be spherical lenses. According to the invention, spherical lenses with a circular circumference can be used, but if achievement of complete covering of the microlens array by microlenses is desired, then it is possible to use spherical lenses which have a rectangular edge and/or aperture in the plane of the microlens array. Included herein in particular are spherical lenses with a square edge or aperture.

Some of the microlenses or all the microlenses can be anamorphic and/or elliptical lenses. In the plane of the microlens array, these can also have an edge corresponding to the geometry thereof, for example thus an elliptical edge, a rectangular or square edge. Since however the lens diameter is not the same in all azimuthal directions, the numerical aperture and hence the extension of the illuminated surface is dependent upon the azimuthal coordinate. In the case of axially symmetrical lenses, the appearance of the illuminated surface hence corresponds to the edge delimitation of the lenses. A rectangular edge hence provides a virtually rectangular surface, a square edge an again virtually square surface and a circular lens edge leads to a circularly illuminated surface.

In the case of anamorphic or elliptical lenses, the numerical aperture of the lenses can be adjusted in addition via an azimuthally-dependent focal distance of the lenses instead of merely via the geometrical extension of the lenses.

According to the invention, the use of cylindrical lenses is however also possible. Such cylindrical lenses can have a constant focal distance in the direction of the cylinder axis. The cylinder axis is hereby, as also in all other uses of cylindrical lenses, parallel to the plane of the microlens array.

However it is also according to the invention that the focal distance of one, several or all cylindrical lenses changes continuously along the cylinder axis. This change can be effected according to a function of the above-described type. In addition to a constant change in focal distance, a non-constant change is also possible. The edges of the cylindrical lenses in the plane of the microlens array can be situated parallel to the cylinder axis. However they can also describe any line, for example an undulating line. If complete covering of the microlens array with microlenses is the goal, then it is advantageous if the edges of adjacent cylindrical lenses extend parallel to each other. If cylindrical lenses are used, then it is also possible that the individual cylindrical lenses extend in the direction of the cylinder axis over the entire extension of the microlens array in this direction. Such cylindrical lenses can be disposed on the microlens array as strips.

Firstly, cylindrical lenses make homogenisation of radiation possible in only one direction. For homogenisation of the radiation in two directions which are perpendicular to each other, arrangements of two crossed cylindrical lenses can however also be used. Furthermore, also two devices, such as are described in the present application, can be disposed with one or more microlens arrays in succession in the direction of the beam path. The front device in the direction of the beam path homogenises the radiation in a first direction and the rear device in the direction of radiation homogenises the radiation in a second direction perpendicular to the first direction. In this way, homogenisation in a plurality of directions can also be achieved with cylindrical lenses. If cylindrical lenses with parallel edges are always used, these can be produced particularly well by means of a reflow technology.

In some of the embodiments described in conjunction with the present invention, lenses are disposed in the focus of other lenses. It is advantageous in all these embodiments if the lens disposed in the focus is disposed not exactly in the focus but displaced for instance in the direction of the beam path or counter to the beam path. In this way, heating of these lenses can be avoided. There is possible for example a displacement in the range of 1 to 5% of the focal distance of the focusing lens.

The homogenisation can be improved if the device is moved relative to the incident radiation in a direction perpendicular to the incident radiation. Such a movement can be for example an oscillation. If a Fourier lens is used, then it is also possible furthermore to move the microlens arrays relative to the Fourier lens in order to achieve improved homogenisation. Advantageously, the Fourier lens remains stationary relative to the incident radiation.

The present invention is produced advantageously with one, with two or with three chirped microlens arrays which are disposed in succession in the beam path.

If only one chirped microlens array is used, then the lens arrangement is a microlens array and the lens systems are respectively individual microlenses. These microlenses are disposed advantageously on a surface which can be formed as described above. In order to deflect the main beams of the beam bundles produced by the individual microlenses to a common point, a Fourier lens is disposed in the direction of the beam path behind the microlens array with the lens plane parallel to the main planes of the microlenses advantageously such that the optical axes of the microlenses pass through the Fourier lens. The use of a Fourier lens is optional. The spatial extension of the surface to be illuminated in the homogenisation plane depends solely upon the numerical aperture of the lenses and upon the focal distance of the optional Fourier lens. Advantageously, each lens in such a chirped microlens array has the same numerical aperture. For all lenses of the array, the ratio of diameter or dimension to focal distance is then constant, the absolute values of the focal distance and of the diameter or the dimension being able to be freely chosen and being able to be described by functions as mentioned above. In the case of non-round lenses, the dimension can for example be an edge length or the width of the lens in the corresponding direction.

If two microlens arrays are used, then, in addition to a first microlens array, a second microlens array with a large number of microlenses disposed with parallel optical axes is disposed such that the optical axes of the microlenses of the first microlens array pass through the microlenses of the second microlens array. The microlens arrays are therefore disposed in succession in the beam path of the incident radiation. Two microlenses disposed in succession in this manner can respectively form a lens system. Both microlens arrays can be disposed respectively on a surface as described above. Advantageously, the second microlens array has the same number of microlenses as the first microlens array. There is thereby subsequently connected directly to each microlens of the first microlens array a microlens of the second microlens array of the same focal distance, so that the optical axis of the corresponding microlens of the first microlens array passes through the corresponding microlens of the second microlens array. The optical axes of the microlenses of the first microlens array are situated parallel to the optical axes of the corresponding lenses of the second microlens array. In particular, the optical axes can also coincide. The spacing of the microlenses of the second microlens array from the corresponding microlenses of the first microlens array is precisely the focal distance of the corresponding microlens of the first microlens array. The microlens of the second array is therefore situated in the focus of the microlens of the first array.

Light bundles which have the second microlens array passing through are deflected according to the invention such that they are superimposed at a specific spacing from the second microlens array. There are two possibilities for this. The first possibility is to dispose the microlenses of the second microlens array such that their optical axes do not coincide exactly with the optical axes of the corresponding microlenses of the first microlens array but are in fact displaced mutually precisely such that a beam bundle which impinges from the first microlens array is deflected by the corresponding microlens of the second microlens array by a specific angle. This angle is chosen such for each microlens that the corresponding beam bundle is deflected to the desired region in which the beam bundles are intended to be superimposed. The offset of the second lens of one channel results from the focal distance of the lens and the spacing of the optical axis of this channel relative to the optical axis of the total structure. The lenses of the second array are hereby displaced in a direction parallel to the plane of the lenses. Alternatively hereto, the deflection can also be effected by a Fourier lens disposed in the direction of the beam path behind the second microlens array. In this case, the optical axes of the microlenses of the first microlens array coincide advantageously with the optical axes of the corresponding microlenses of the second microlens array. Therefore no deflection takes place here. Only the subsequent Fourier lens deflects all the beam bundles to a common region.

Also when using two chirped microlens arrays, the diameters $d_i$ of the lenses of the first array need not be identical but the focal distances $f_i$ are adapted such that the same numerical aperture is produced channel-wise ($d_i/f_i$=constant). The lens systems comprising respectively a lens of the first microlens array and a lens of the second microlens array therefore have the same numerical aperture in at least one direction. As described, the focal distance of the lenses of the first array is advantageously equal to the focal distance of the lenses of the second array.

In the case where anamorphic lenses are used, the second microlens array can be split into two arrays comprising cylindrical lenses, the cylindrical lenses being disposed so as to cross. The reason for this is the different refractive power of the anamorphic lenses in two perpendicular directions and the condition that the two lenses must be situated in the focal distance of the first lens.

If three microlens arrays are used, not necessarily cylindrical lenses being used, then a third microlens array is placed subsequent to the lens arrangement comprising first and second microlenses in the direction of the beam path. Advantageously, the optical axes of the microlenses of the first microlens array and of the second microlens array hereby coincide. The third microlens array is then disposed such that these optical axes pass through it. Advantageously, the third microlens array has the same number of microlenses as the lens systems preconnected by the first and second microlens array. A microlens of the third microlens system is connected subsequently thereby to each lens system. The optical axes are again situated advantageously parallel or coincide. Also in the case of three microlens arrays, the beam bundles must be deflected towards a common region, for which purpose again two possibilities exist. On the one hand, the optical axes of the microlenses of the third microlens system, as described above for two microlens systems, can be displaced to the optical axes of the lens systems such that the lenses of the third array deflect the incident beam bundles to a common region. Alternatively hereto, also a Fourier lens can again be used.

The microlenses of adjacent microlens arrays can be disposed, in a preferred variant, respectively on one side on a substrate made of a transparent material, in particular glass or a transparent polymer material. The substrates with associated microlens arrays can thereby also be disposed at a spacing relative to each other, the intermediate space between the substrates being filled with air or a transparent material, in particular glass or transparent polymer materials.

It is likewise possible that the microlenses of two adjacent microlens arrays are disposed on surfaces of a body made of a transparent material, in particular glass or a transparent polymer material, which surfaces are situated in succession in the beam path. For example prisms and bodies with a rectangular cross-section are preferred here as bodies. However also other bodies with surfaces situated in succession in this manner are possible for this purpose.

BRIEF DESCRIPTION OF THE DRAWINGS

The present invention is described subsequently with reference to a few embodiments.

FIG. 1 shows a homogenisation device with a regular microlens array according to the state of the art.

DETAILED DESCRIPTION OF THE INVENTION

Figure 2:
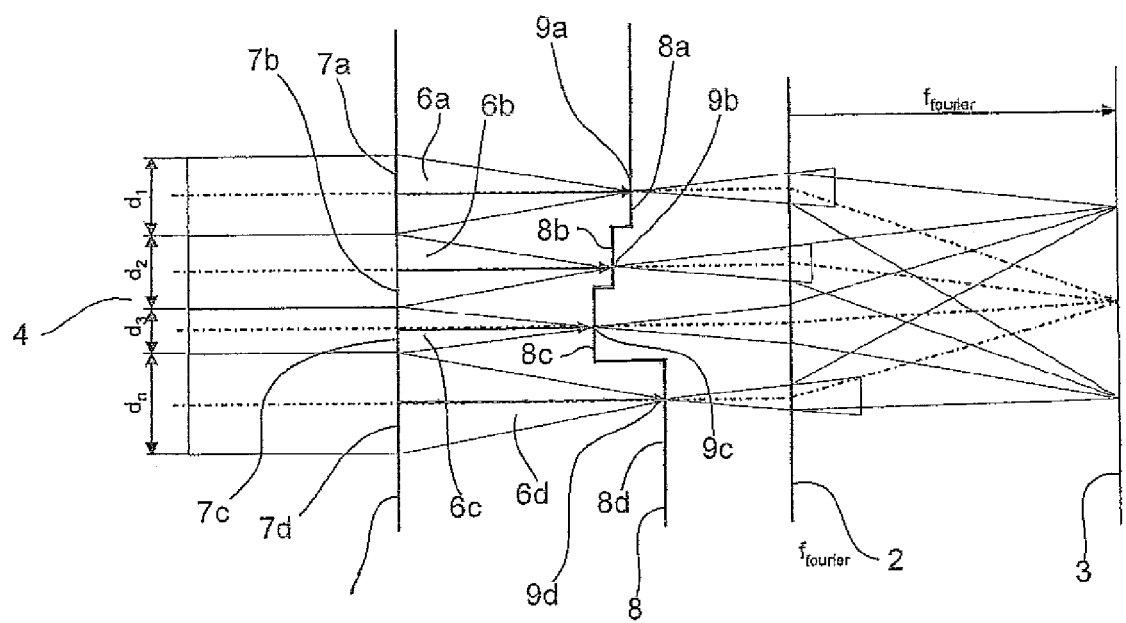
FIG. 2 shows a homogenisation device with two chirped microlens arrays.

FIG. 1 shows a homogenisation device having a regular microlens array 1 according to the state of the art. The incident radiation 4 hereby impinges on the regular microlens array 1 where it is bundled initially by the microlenses 1a to 1e at the focal points thereof in order then to move apart divergently behind these focal points. The partial bundles 6a to 6e produced by the individual microlenses 1a to 1e impinge on the Fourier lens 2 after passing through the individual focal points. The angle of divergence with which the partial beams 6a to 6e move apart behind the focal point corresponds to the numerical aperture of the microlenses 1a to 1e. The Fourier lens 2 now deflects the individual beam bundles 6a to 6e in such a manner that the individual partial bundles 6a to 6e are situated one above the other in the focal plane 3 of the Fourier lens 2. As a result of the fact that the power proportions 6a to 6e which impinge in the focal plane 3 of the Fourier lens 2 originate from different individual lenses, the surface in the focal plane 3 of the Fourier lens 2 is illuminated homogeneously. The degree of homogenisation is thereby dependent upon the number of individual lenses 1a to 1e. In the case of a sufficiently large number of individual lenses 1a to 1e, the homogenisation is virtually independent of the input intensity distribution 4. However it is a condition that the numerical aperture of the incident radiation corresponds at most to the numerical aperture of the lenses. The extension of the homogeneously illuminated surface is determined by the numerical aperture of the lenses 1a to 1e and the focal distance of the Fourier lens 2. In order to keep optical losses as small as possible, the entire surface of the lenses 1 with lenses 1a to 1e, which is impinged upon by the radiation, should be covered. The filling factor of the microlens array 1 should therefore be as close to 1 as possible.

Insert A of FIG. 1 shows the intensity distribution of the radiation which passes through the homogenisation device in the illuminated surface 3 for the case where the microlens array 1 has only one single lens. The intensity distribution A shows variations in intensity produced by interference effects. These impair the homogeneity of the light.

Insert B of FIG. 1 shows the intensity distribution of the radiation impinging in the surface 3 to be illuminated when using a microlens array 1 with a large number of individual microlenses 1a to 1e. The intensity distribution B is modulated with the same interference pattern which also impinges in the case of a single lens. Furthermore, the regularly disposed microlenses 1a to 1e of the regular microlens array 1 act however as a grating, as a result of which the intensity in the illuminated surface reduces to zero at regular spacings. The spatial distance of the intensity maxima is thereby inversely proportional to the width of the individual lenses 1a to 1e, i.e. the smaller the lens, the greater is the spacing between the maxima. This also means that the use of smaller lenses leads to poorer homogenisation of the light in the surface 3 to be illuminated. If however larger lenses 1a to 1e are used, then the number thereof is smaller, as a result of which the homogeneity is likewise reduced. The homogenisation capacity of the light when using regular microlens arrays is therefore subject to a limit in principle.

FIG. 2 shows the arrangement of a homogenisation device according to the invention having two microlens arrays 7 and 8. The light to be homogenised hereby impinges firstly on the first microlens array 7, where individual partial light bundles 6a to 6d are produced by the individual microlenses 7a to 7b. These light bundles 6a to 6d then impinge on the second microlens array 8 and subsequently on the Fourier lens 2 which deflects the individual partial bundles 6a to 6b to a common region in the focal plane 3 of the Fourier lens 2. In contrast to the regular microlens array, the microlenses 7a to 7b of the chirped microlens array 7 used here are not identical. Rather the microlenses 7a to 7d used here have different diameters and different focal distances 9a to 9d. The second microlens array 8 is now configured such that, for each microlens 7a to 7d of the first microlens array 7, a microlens 8a to 8d of the second microlens array 8 exists. These second microlenses 8a to 8d are thereby disposed respectively in the focal points 9a to 9b of the corresponding microlenses 7a to 7d of the first microlens array 7. These focal distances 9a to 9d are different in the illustrated example so that the individual lenses 8a to 8d are not situated in one plane. The first lenses 7a to 7d have different diameters and different focal distances but their numerical aperture is the same. Such a homogenisation device produces a homogeneous intensity distribution in the focal plane 3 of the Fourier lens 2.

Figure 3:
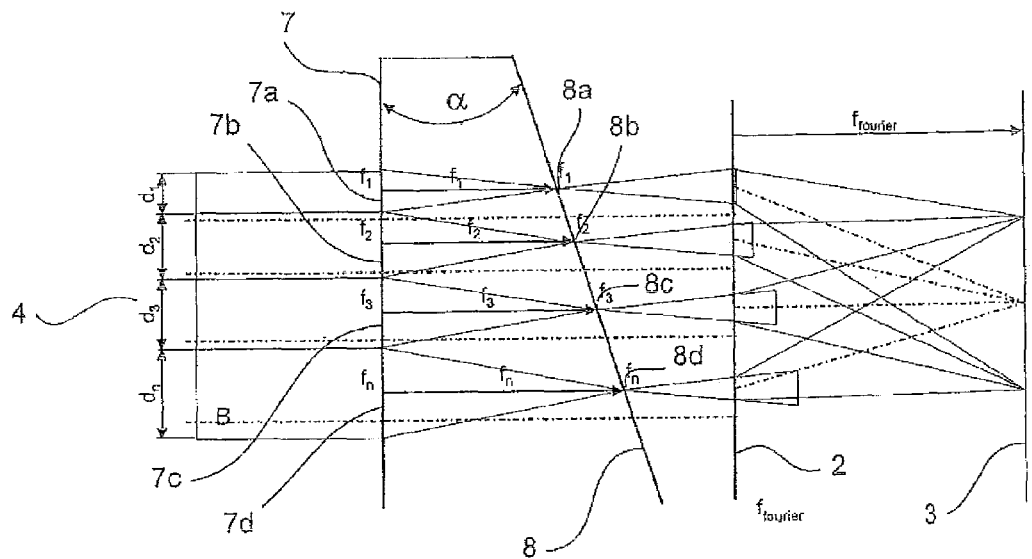
FIG. 3 shows a homogenisation device with two chirped microlens arrays which are accommodated on planar substrates.

FIG. 3 likewise shows a homogenisation device according to the invention with two chirped microlens arrays 7 and 8. In contrast to the device shown in FIG. 2, the individual lenses 7a to 7d of the first microlens array 7 are however ordered here according to their diameters or focal distances. Since the microlenses 8a to 8d of the second microlens array 8 are accommodated again in the focal distances of the corresponding microlenses 7a to 7d of the first microlens array 7, these lenses 8a to 8d come to be situated on one plane. Due to the different focal distances, this plane 8 relative to the plane 7 is inclined by an angle α. As in FIG. 2 also, the produced beam bundles 6a to 6d are deflected by the Fourier lens 2 in the focal distance thereof to a common surface.

Figure 4:
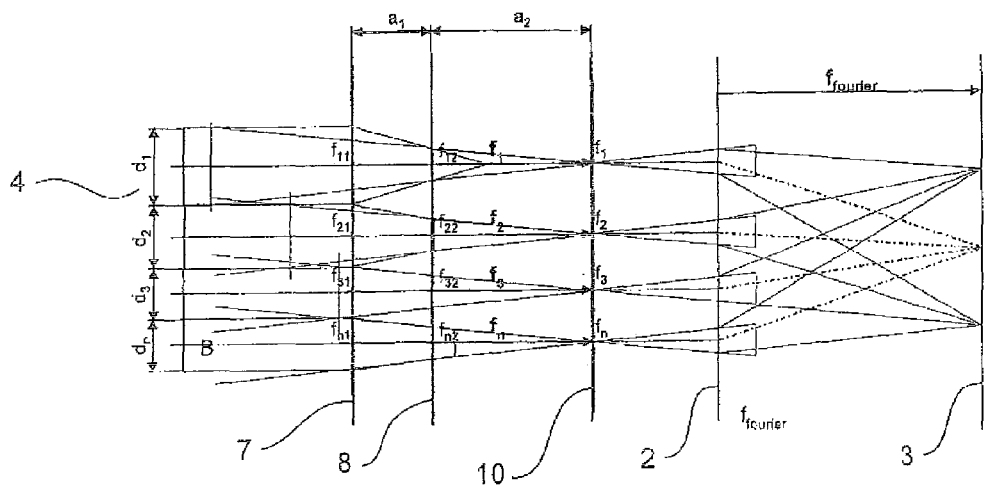
FIG. 4 shows a homogenisation device with three chirped microlens arrays.

FIG. 4 shows a homogenisation device according to the invention having three microlens arrays 7, 8 and 9. Again the light 4 to be homogenised impinges firstly on the first microlens array 7 which splits the light beam 4 into partial bundles 6a to 6d due to the individual lenses 7a to 7d. There is assigned to each microlens 7a to 7d of the first microlens array 7, a microlens 8a to 8d of the second microlens array 8. In the illustrated example the optical axes of the microlenses 7a to 7d of the first microlens array 7 coincide with the optical axes of the corresponding lenses 8a to 8b of the second microlens array 8. The pairs of microlenses 7a, 8a and 7b, 8b and 7c, 8c and 7d and 8d respectively form one lens system with a resulting focal distance. In the focal points 9a to 9d, resulting therefrom, of these lens systems comprising microlenses 7a to 7d and microlenses 8a to 8d, the microlenses 10a to 10d of the third microlens system 10 are disposed. The microlenses 7a to 7d and 8a to 8d can have different diameters, dimensions and/or focal distances. It is crucial that the numerical apertures of the lens systems comprising microlenses 7a to 7d of the first microlens system 7 and the microlenses 8a to 8d of the second microlens system 8 have the same numerical aperture in at least one direction. After the light bundles 6a to 6d have passed through the three microlens arrays 7, 8 and 10, they impinge on the Fourier lens 2 which deflects the individual light bundles 6a to 6d to a common region 3 which is then illuminated homogeneously. As also in the other illustrated examples, it is also advantageous here if microlenses 7a to 7d, 8a to 8d and 10a to 10d completely cover the surfaces of their arrays 7, 8 or 10 as completely as possible, i.e. that the filling factor of the microlens arrays is situated as far as possible close to 1.

Figure 5:
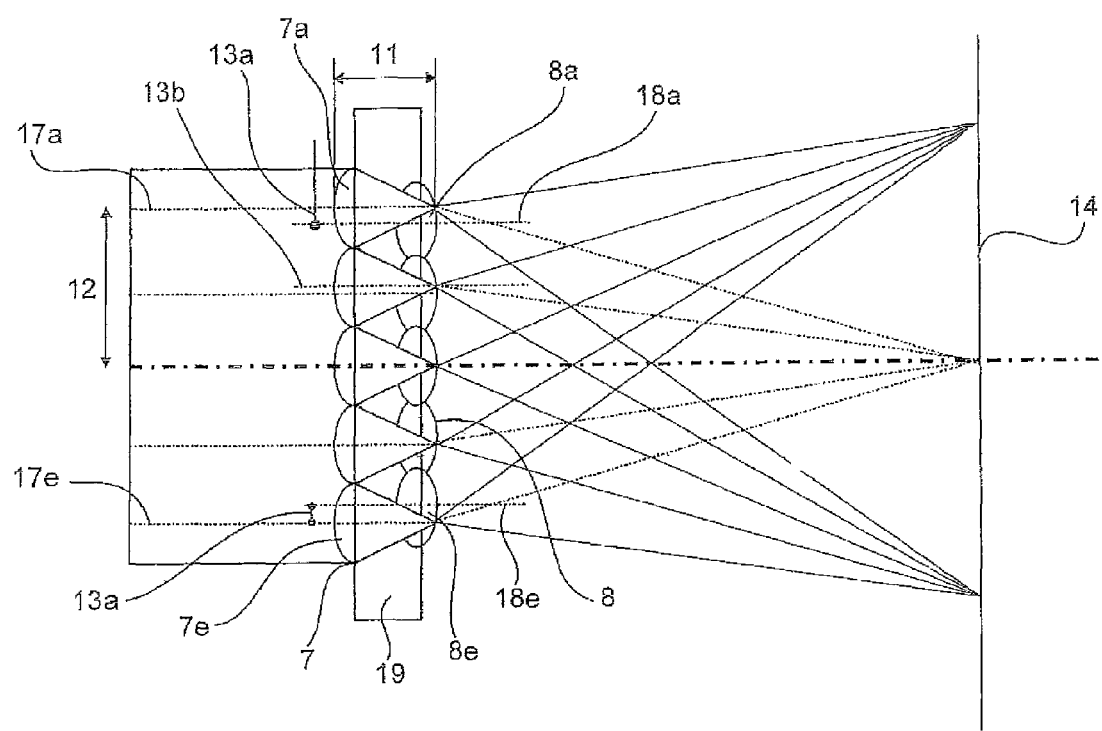
FIG. 5 shows an arrangement with two microlens arrays, the microlenses of which are offset laterally to each other.

FIG. 5 shows by way of example an arrangement of two microlens arrays 7 and 8, through which the individual light bundles can be deflected to a common region 14 without a Fourier lens. In the illustrated example, the microlenses 7a to 7e and 8a to 8e are disposed at the spacing of their focal distance 11 on oppositely situated sides of a planar substrate 19. The optical axes 17a to 17e of the microlenses 7a to 7e of the first microlens array 7 respectively pass through the microlenses 8a to 8e of the second microlens array 8. In contrast to the case of using a Fourier lens, these optical axes 17a to 17e do not however coincide with the corresponding optical axes 18a to 18e of the corresponding microlenses 8a to 8e of the second microlens array 8, but instead are situated parallel to these, offset by spacings 13a, 13b. The offset 13a, 13b is hereby chosen dependent upon the spacing 12 of the corresponding optical axis 17a from the centre of the incident beam such that a partial beam passing through a microlens 7a to 7e is deflected by the corresponding microlens 8a to 8e subsequently such that it illuminates a region 14 common to all microlenses 7a to 7e. For the general structure with lenses chirped quasi-continuously in the direction parallel to the plane of the microlens arrays, the offset $\Delta x_i$ (y) of the last lens of the $i^{th}$ channel from the focal distance $f_i$ (y) and the spacing $r_i$ (y) of the optical axis of the channel relative to the optical axis of the total structure results.

Figure 6:
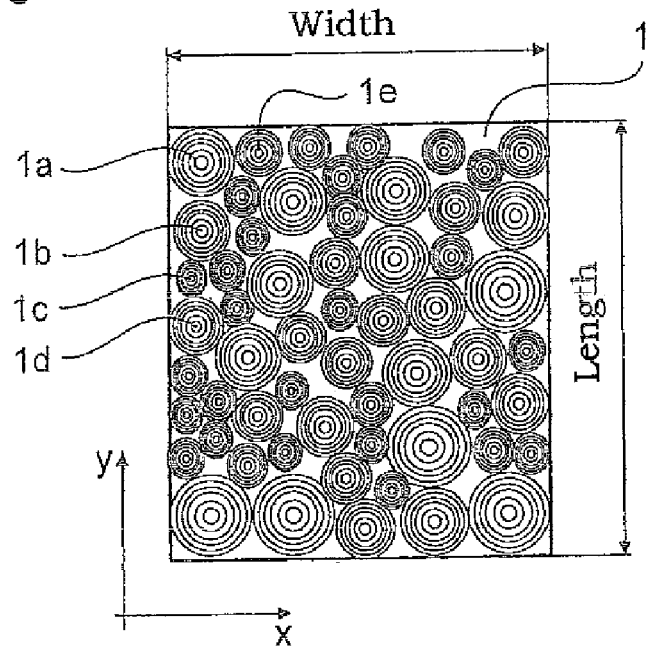
FIG. 6 shows a chirped microlens array with axially symmetrical lenses with a round lens edge.

FIG. 6 shows a chirped microlens array 1 in plan view on its surface. In the illustrated example, the individual microlenses 1a to 1e etc. are axially symmetrical, have a circular lens edge and different diameters. The numerical apertures of the individual lenses 1a to 1e are however identical at least in one direction, i.e. for example the x- or y-direction. This means that the numerical aperture in the corresponding direction is the same for all lenses. The microlenses 1a to 1e in the illustrated example are axially symmetrical and have a circular circumference. Advantageously, they are distributed such that the surface of the microlens array 1 is covered as completely as possible by the microlenses 1a to 1e etc.

Figure 7:
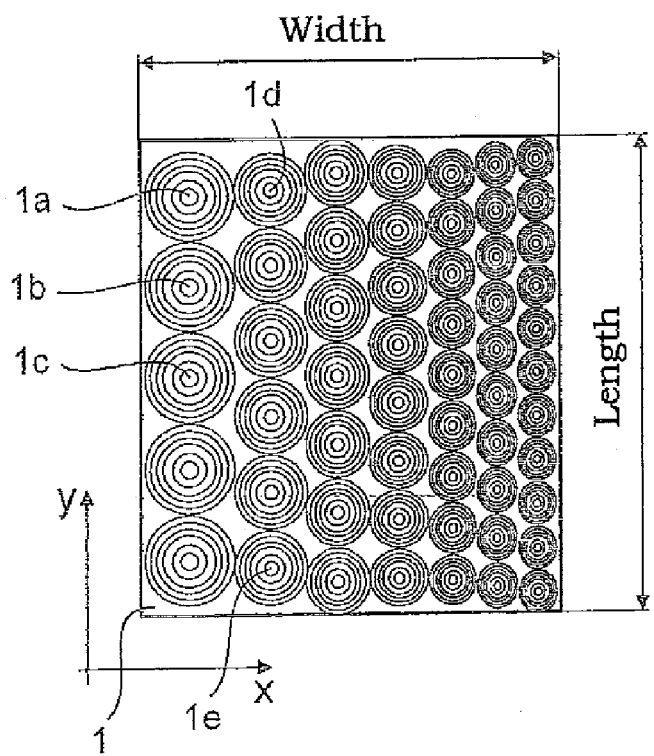
FIG. 7 shows a chirped microlens array with axially symmetrical lenses with a round lens edge and ordered diameters.

FIG. 7 also shows the plan view on the surface of a microlens array 1. The large number of microlenses 1a to 1e etc. are again axially symmetrical about their optical axis which is situated perpendicular to the surface of the microlens array 1 and have a circular circumference in the surface of the microlens array. In contrast to the microlens array 1 shown in FIG. 6, the large number of microlens arrays 1a to 1e in the case shown in FIG. 7 are ordered in x-direction according to their diameter. In y-direction, all the microlenses 1a, 1b and 1c have the same diameter. Again, an arrangement which covers the surface of the microlens array 1 as completely as possible is chosen advantageously.

Figure 8:
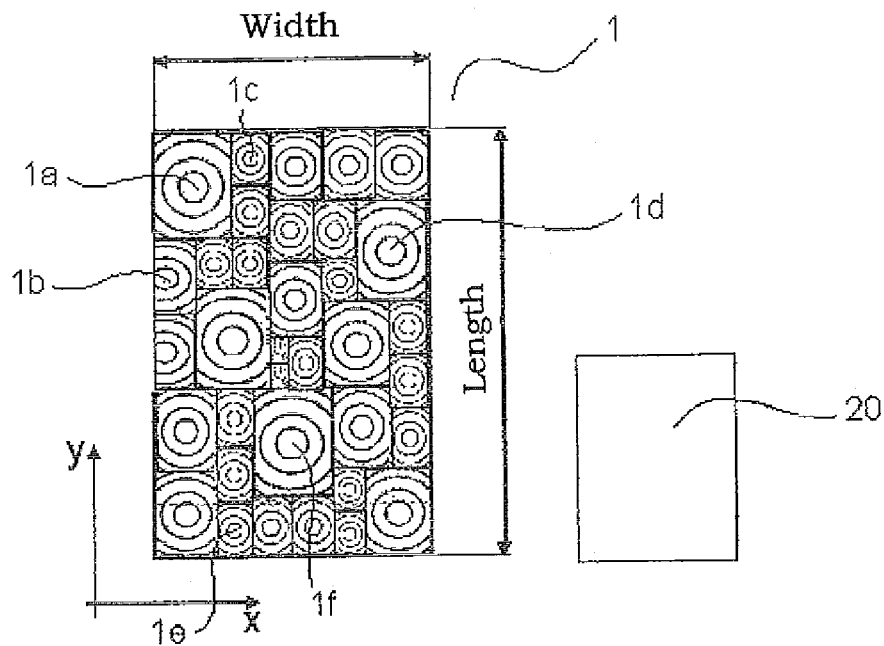
FIG. 8 shows a chirped microlens array with axially symmetrical lenses with a rectangular lens edge.

FIG. 8 shows the plan view on the surface of a microlens array 1 with a large number of microlenses 1a to 1f which are axially symmetrical and/or spherical and have a rectangular lens edge. In the example shown here, the lenses have different dimensions and different focal distances and are present without sorting. The numerical aperture of these lenses must however be the same respectively in at least one direction, i.e. for example the x- or the y-direction, as is also the case in the other examples. The numerical aperture of each lens in the other direction can be different. The numerical aperture can also be the same respectively for each lens in all directions. As a result of the fact that the illustrated microlenses 1a to 1f etc. have rectangular edges, complete covering of the surface of the microlens array 1 is possible and advantageous. Whilst the microlens arrays shown in FIG. 6 and FIG. 7 produce circularly illuminated surfaces, a rectangular illuminated surface 20 is produced by the microlens array shown in FIG. 8.

Figure 9:
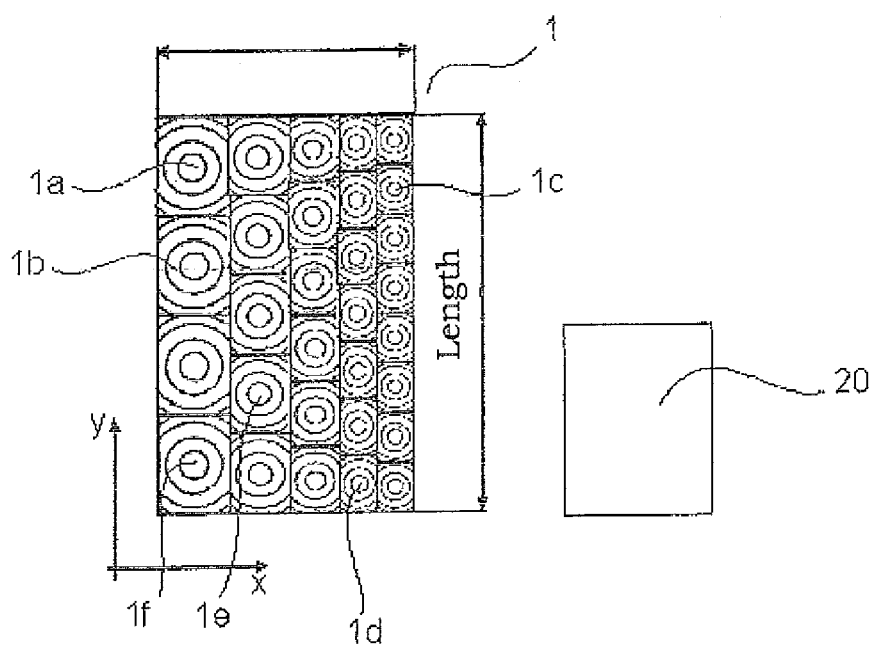
FIG. 9 shows a chirped microlens array with axially symmetrical lenses with a rectangular lens edge, the microlenses being ordered according to size.

FIG. 9 shows a microlens array 1 which corresponds to that shown in FIG. 8. Again, a large number of axially symmetrical and/or spherical microlenses 1a to 1f are disposed adjacently covering the surface. The microlenses 1a to 1f here are not present without order but have the same length for a given x-position respectively in y-direction, whilst the width and length of the microlenses reduces in x-direction. Lenses at different x-positions also have different lengths in order that these have different focal distances. The numerical aperture in y-direction is the same for all lenses of the array. In the example illustrated here, the illuminated surface 20 of a homogenisation device with such a microlens array 1 is also rectangular.

Figure 10:
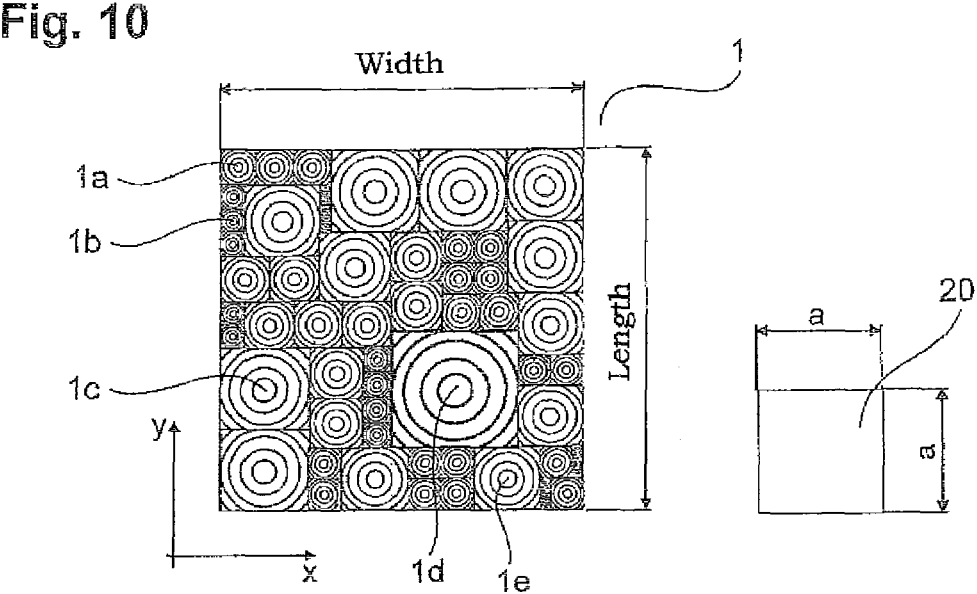
FIG. 10 shows a chirped microlens array of axially symmetrical lenses with a square lens edge.

FIG. 10 shows an arrangement of axially symmetrical microlenses which are rotationally symmetrical about their optical axis. As also in the other microlens arrays shown in FIG. 6 to FIG. 9, these optical axes of the individual microlenses 1a to 1e are perpendicular to the surface of the microlens array 1. The microlenses 1a to 1e are axially symmetrical and/or spherical and have a square lens edge. The microlenses 1a to 1e are not ordered but are disposed such that they cover completely the surface of the microlens array 1. The illustrated microlens array 1 will produce a square illuminated surface 20 in a homogenisation device according to the invention.

Figure 11:
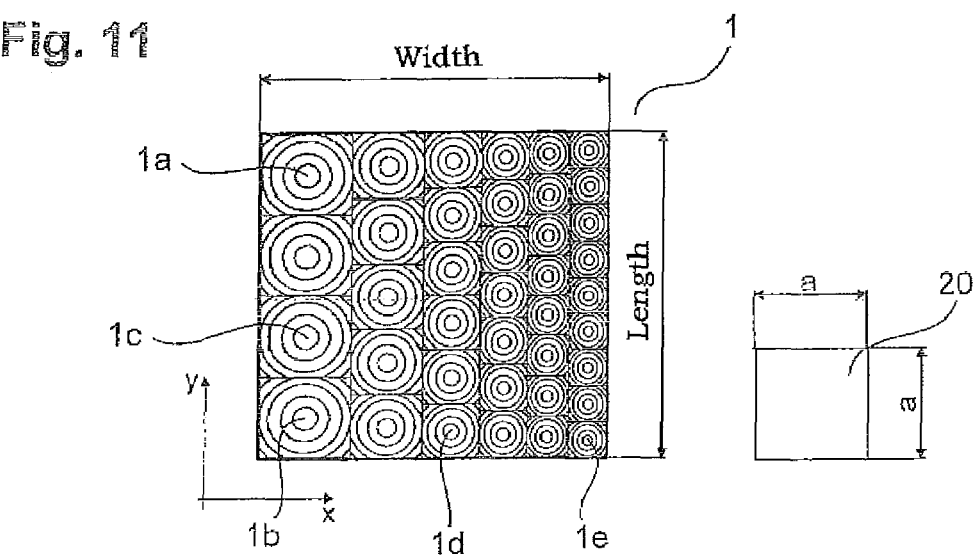
FIG. 11 shows a chirped microlens array of axially symmetrical lenses with a square lens edge which are ordered according to their size.

FIG. 11 likewise shows a chirped microlens array 1 with a large number of microlenses 1a to 1e which are spherical or axially symmetrical and have a square edge. In the case shown here, the microlenses are however not present without order but are sorted along the width of the microlens array 1 in x-direction corresponding to their edge length. Along the length of the microlens array 1 in y-direction, microlenses 1a, 1b, 1c with the same edge length are situated adjacently at a given height in x-direction. The microlenses 1a to 1e shown here also produce an illuminated surface 20 which is square in a homogenisation device according to the invention.

Figure 12:
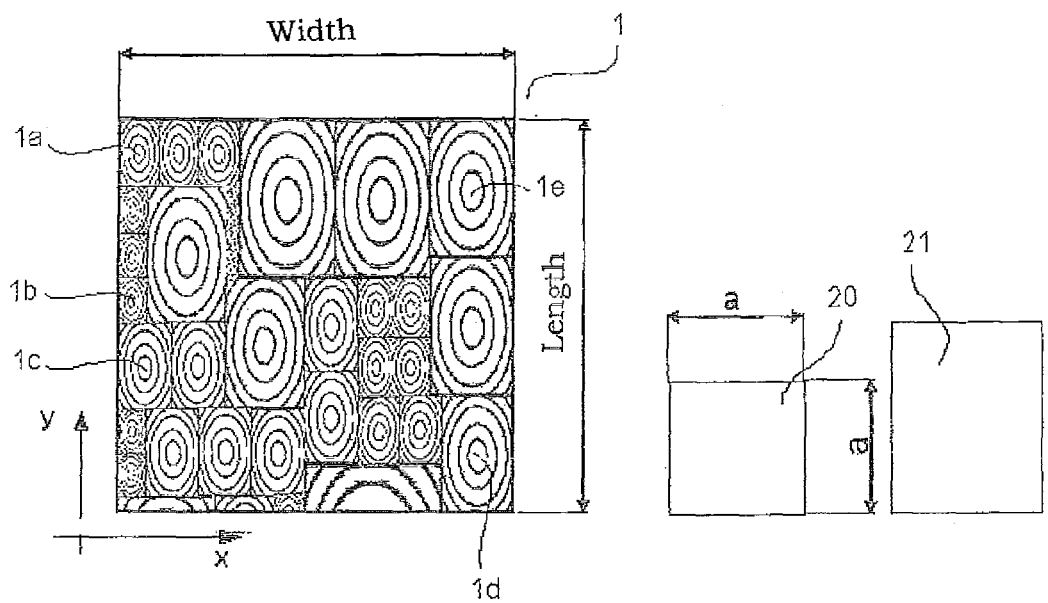
FIG. 12 shows a chirped microlens array of anamorphic lenses with a rectangular lens edge.

FIG. 12 shows a chirped microlens array 1 with a large number of anamorphic lenses, e.g. elliptical lenses 1a to 1e, which have a rectangular lens edge. The focal distance of each of these lenses 1a to 1e is different in different directions. Also the numerical aperture of each individual lens can therefore be different in different directions. For the present invention, the numerical aperture of each microlens is the same in one direction, e.g. the y-direction. In the perpendicular direction, the numerical aperture of each microlens 1a to 1e can be different but is however advantageously identical likewise for all microlenses. If the numerical aperture of the microlenses 1a to 1e differs in the one direction from the numerical aperture of the microlenses in the perpendicular direction and if it is the same in the corresponding direction for all microlenses, then a rectangular illuminated surface 21 is produced in a homogenisation device according to the invention. If the numerical apertures are identical in both directions, then the illuminated surface 20 is square. If the focal distance of a lens is given in a specific direction, the numerical aperture of this lens can be adapted in direction in the corresponding direction by the extension of this lens.

Figure 13:
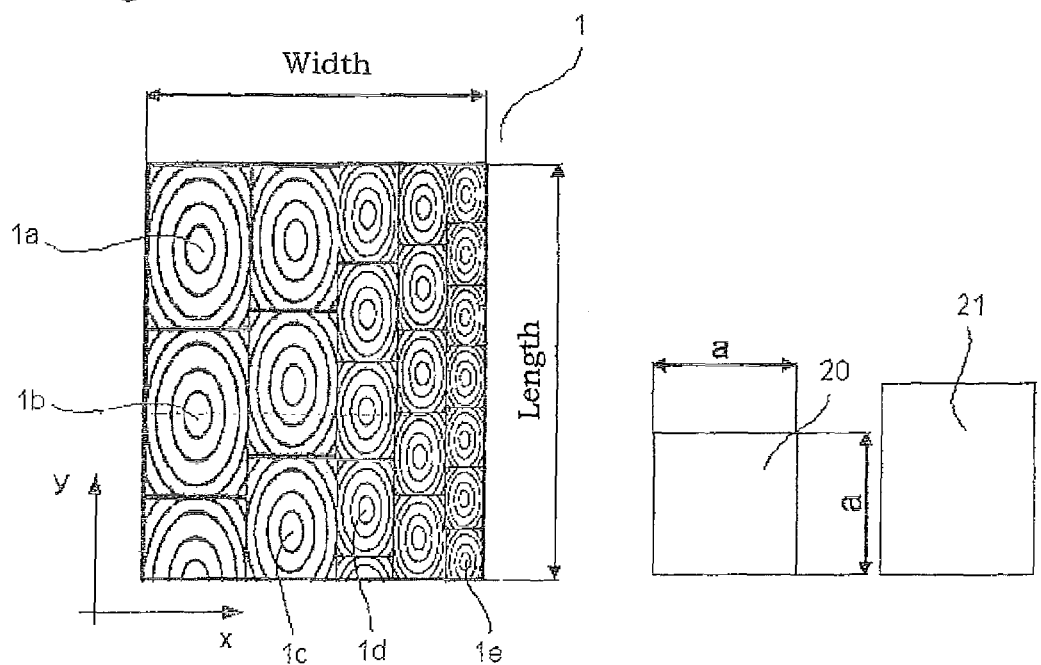
FIG. 13 shows a chirped microlens array of anamorphic lenses with a rectangular lens edge, which are ordered according to their size.

FIG. 13 shows a chirped microlens array with an arrangement of anamorphic or elliptical lenses 1a to 1e with a rectangular lens edge which are ordered along the width in x-direction according to their edge lengths in x-direction and, in y-direction, have respectively the same edge length in y-direction for a given x-position. As described also for FIG. 12, the numerical aperture of each lens 1a to 1e is identical for all lenses in at least one direction. Furthermore, if it is also identical for the other direction, then a rectangular illuminated surface 21 is produced. Furthermore, if the numerical apertures are the same for both directions, then the illuminated surface 20 is again square.

Figure 14:
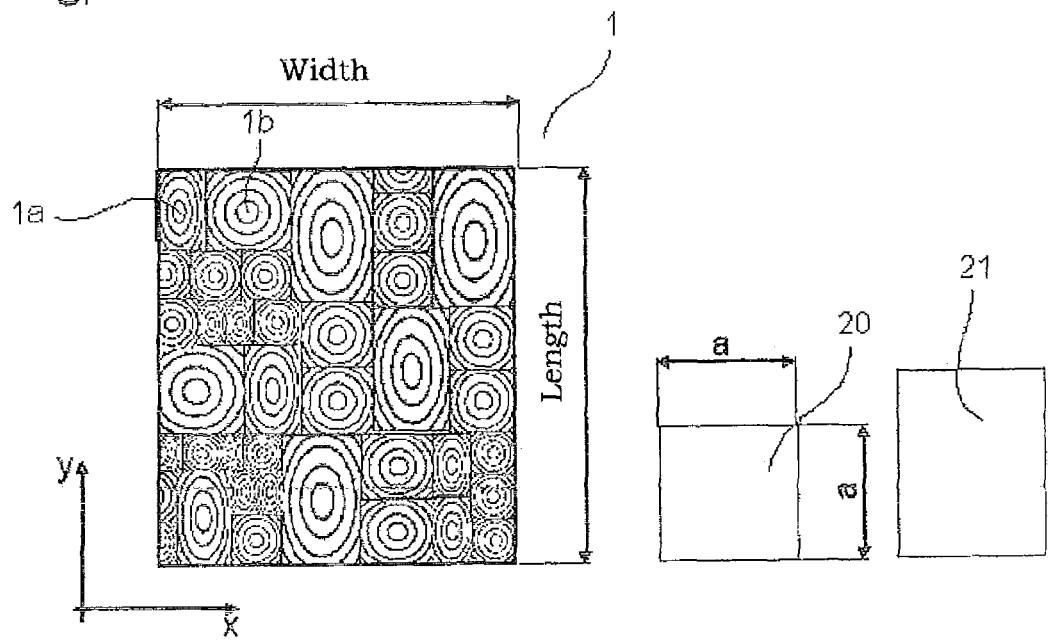
FIG. 14 shows a chirped microlens array with a mixture of axially symmetrical and anamorphic lenses with a rectangular lens edge.

FIG. 14 shows a chirped microlens array 1 with a mixture of spherical microlenses 1b and anamorphic microlenses 1a. Again all the microlenses 1a, 1b have rectangular edges. The numerical aperture of the microlenses 1a, 1b in one direction is the same for all microlenses. Advantageously it is also the same for all microlenses in the other direction. Again, with different focal distances of the microlenses, the numerical aperture is adapted in the corresponding direction by the dimension of the microlens. Spherical lenses have the same focal distance in both directions which are perpendicular to each other, they should also have the same numerical aperture in both directions, thus they must be consequently square. Correspondingly, anamorphic lenses 1a have different focal distances in two perpendicular directions, therefore they must be rectangular in order to adjust the same numerical aperture. If the numerical apertures are the same for both directions perpendicular to each other, then a square, illuminated surface 20 is produced. If the numerical apertures are not the same, the illuminated surface 21 is rectangular but not square.

Figure 15:
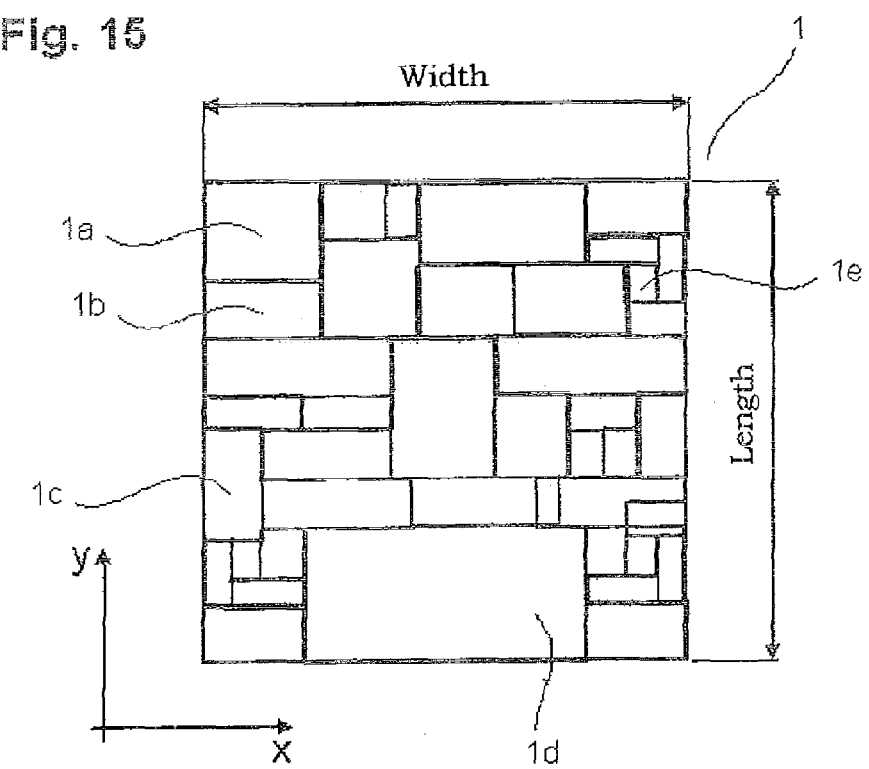
FIG. 15 shows a chirped microlens array with cylindrical lenses, the numerical aperture of which is the same cell-wise.

FIG. 15 shows a chirped microlens array 1 having a large number of cylindrical lenses 1a to 1e. Cylindrical lenses have optical refractive power only in one direction, they are therefore suitable for one-dimensional homogenisation. Two-dimensional homogenisations can be achieved by using two arrays, the cylindrical lenses being disposed so as to cross. In the illustrated example, the cylinder axes of all cylindrical lenses 1a to 1e are orientated in the same direction. In the illustrated example, this could be the x- or the y-direction. The focal distances of the individual lenses 1a to 1e are different. In order however that all the lenses in the corresponding direction have the same numerical aperture, their width, i.e. the spacing of the lens edge from the cylinder axis, is adapted such that the same numerical aperture is produced for all lenses 1a to 1e. In the illustrated example, the cylindrical lenses 1a to 1e are disposed on the surface of the microlens array 1 such that the surface of the microlens array 1 is covered completely by microlenses 1a to 1e.

Figure 16:
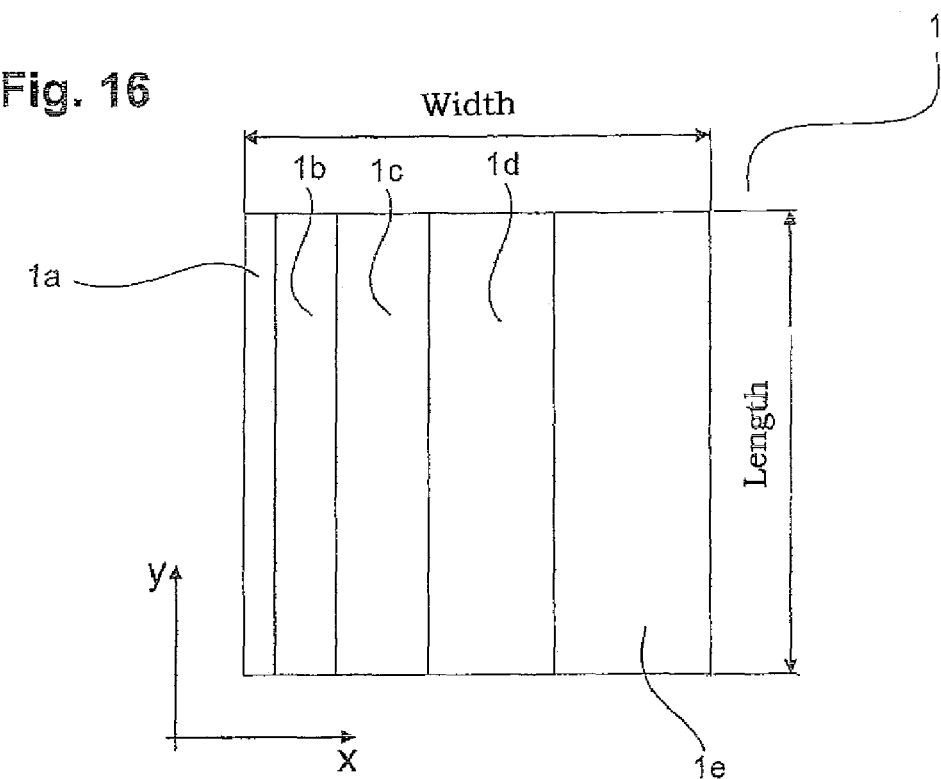
FIG. 16 shows a chirped microlens array with cylindrical lenses of a constant width over the length of the array.

FIG. 16 shows a chirped microlens array 1 with a large number of cylindrical lenses 1a to 1e, the length of which is equal to the length of the microlens array 1. The cylindrical lenses 1a to 1e have a rectangular edge and are disposed with parallel edges and parallel cylinder axes along the length, i.e. the y-direction. Since the cylindrical lenses 1a to 1e have different focal distances, their width in x-direction is also different so that the same numerical aperture is produced for all cylindrical lenses 1a to 1e. Such arrays of cylindrical lenses can be produced by means of reflow technology which is an established technology for the production of microlenses of very good optical quality.

Figure 17:
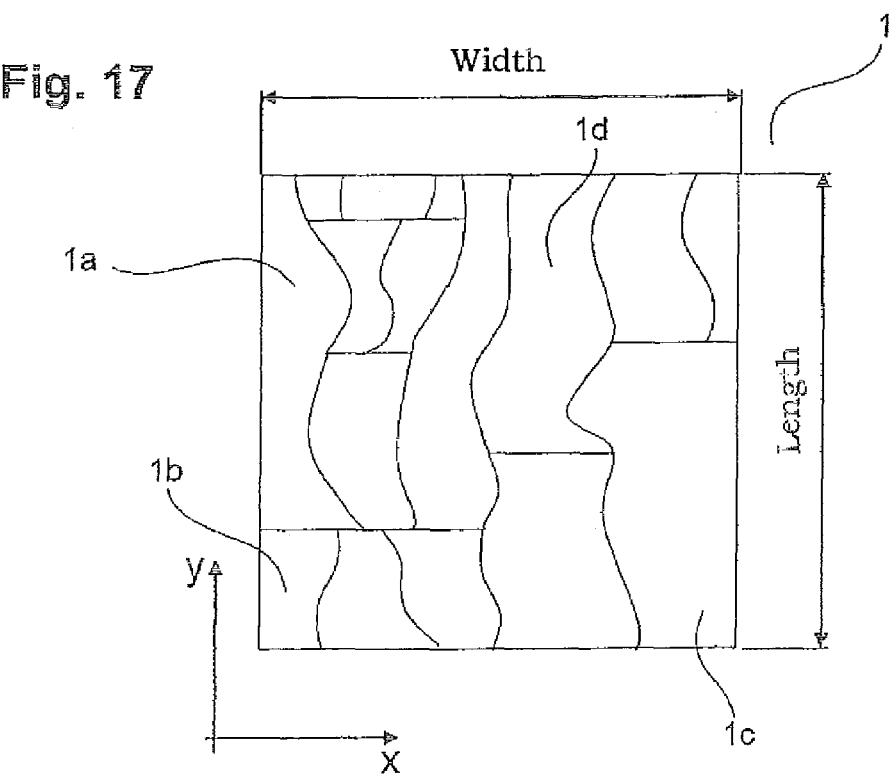
FIG. 17 shows a chirped microlens array with cylindrical lenses, cell portion- and lens portion-wise of the same aperture.

FIG. 17 shows a chirped microlens array 1 with a large number of cylindrical lenses 1a to 1d which are disposed adjacently with cylinder axes orientated parallel in y-direction. In contrast to the example shown in FIG. 15, the cylindrical lenses 1a to 1d have, in the case shown here, freely-formed lens edges. This means that, in y-direction, i.e. in the direction of the length of the microlens array 1, the focal distance and the width of the microlenses 1a to 1e changes, all the microlenses 1a to 1d at a given height y having the same numerical aperture. Due to the quasi-continuous change in width and focal distance, periodicities are avoided better so that intensity variations due to interference can be better avoided.

Figure 18:
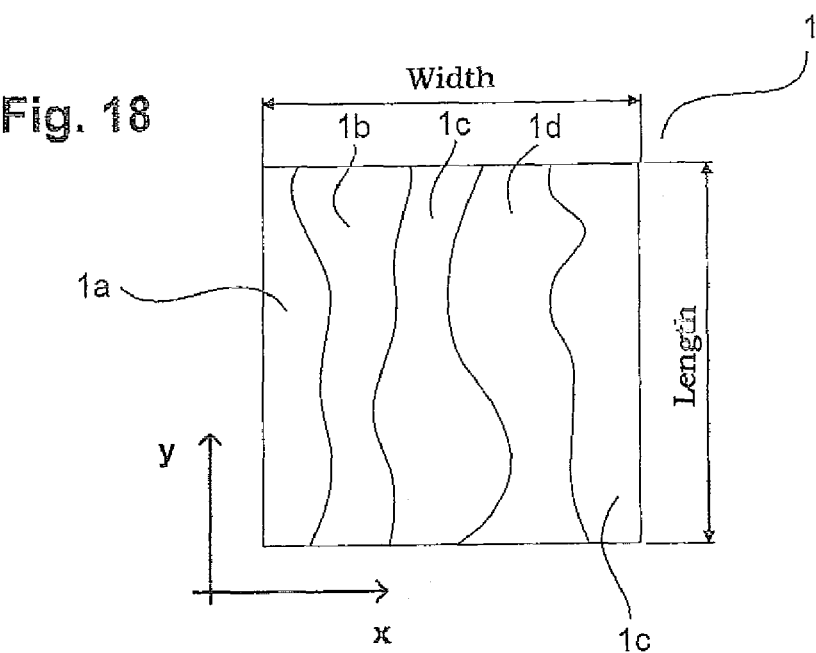
FIG. 18 shows a chirped microlens array with cylindrical lenses of varying width over the length of the array.

FIG. 18 shows a microlens array 1 having a large number of cylindrical lenses 1a to 1e which are disposed adjacently with parallel cylinder axes. The length of the cylindrical lenses 1a to 1e is equal to the length of the microlens array 1, i.e. equal to the extension thereof in y-direction. The width of the individual cylindrical lenses 1a to 1e changes in the direction of their cylinder axis, i.e. in the direction of the length of the microlens array in y-direction. In order to maintain a constant numerical aperture, the focal distance of the corresponding microlenses changes also correspondingly in the mentioned direction. The widths of the cylindrical lenses are coordinated to each other such that the adjacently disposed lenses 1a to 1e completely cover the surface of the microlens array 1.

Figure 19:
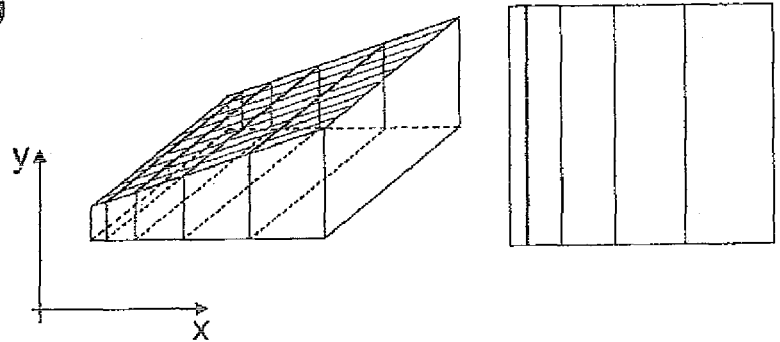
FIG. 19 shows a system with two microlens arrays with cylindrical lenses according to FIG. 16 disposed on flat substrates.

FIG. 19 shows, on the left, a 3D illustration of a system having two microlens arrays, the microlenses comprising cylindrical lenses according to FIG. 16 and being disposed on planar substrates. The substrates thereby assume an angle relative to each other. The cylindrical lenses are orientated in such a manner that the spacing of the two substrates along the cylinder axes is constant. On the right, the plan view on the corresponding microlens array can be seen, corresponding to FIG. 16.

Figure 20:
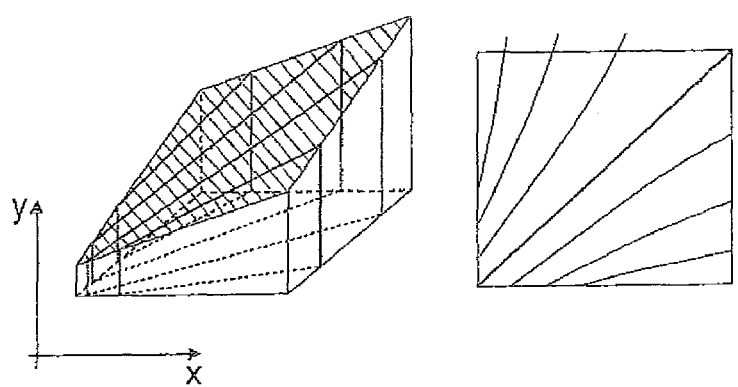
FIG. 20 shows a system with two microlens arrays with cylindrical lenses according to FIG. 18 disposed on flat substrates.

FIG. 20 shows, on the left, a 3D illustration of a system having two microlens arrays, the microlenses comprising cylindrical lenses according to FIG. 18 and being disposed on planar substrates. The substrates thereby assume an angle relative to each other. The cylindrical lenses are orientated in such a manner that the spacing of the two substrates along the cylinder axes is not constant. On the right the plan view on the corresponding microlens array can be seen, corresponding to FIG. 18.

Figure 21C:
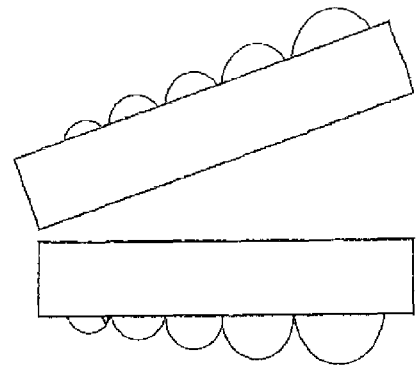
FIG. 21 shows different embodiment variants for devices according to the invention with the help of sectional illustrations.
Figure 21B:
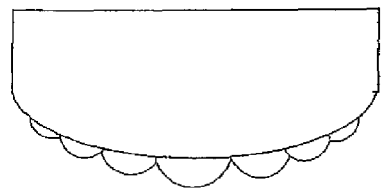
Figure 21A:
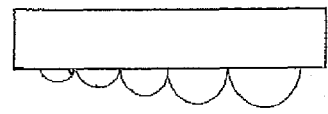
Figure 21F:
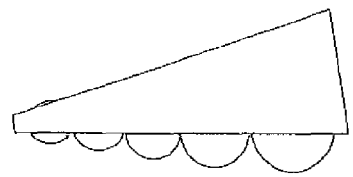
Figure 21E:
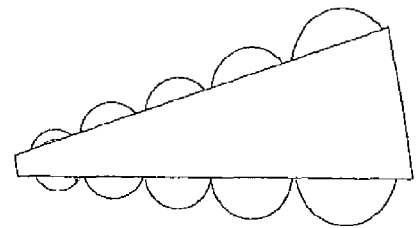
Figure 21D:
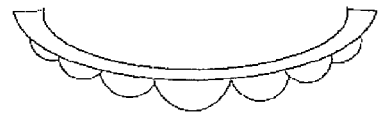
Figure 21I:
Figure 21L:
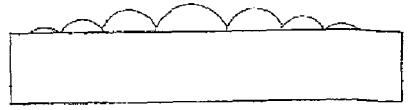
Figure 21H:
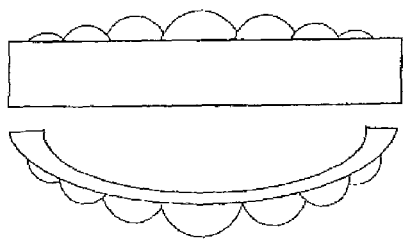
Figure 21K:
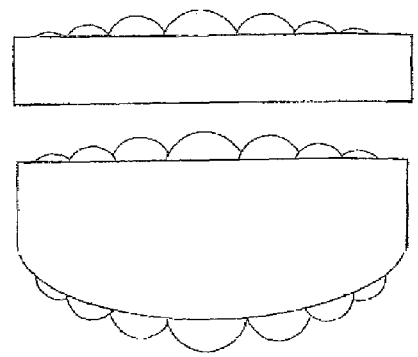
Figure 21G:
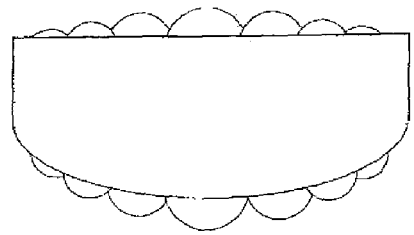
Figure 21J:
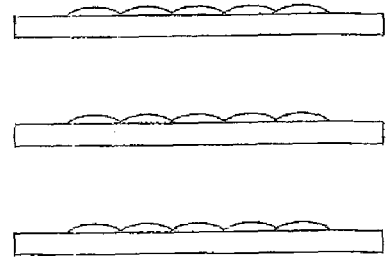

FIG. 21 shows various embodiments by way of example, of how microlens array and substrate or body can be formed. There are shown hereby:

FIG. 21a the arrangement of a microlens array on a planar substrate with surfaces which are not parallel to each other, the microlens array having a planar surface, FIG. 21b the arrangement of a planar microlens array on a planar substrate with parallel surfaces, FIG. 21c the arrangement of the microlens array on a body with curved surfaces, FIG. 21d the arrangement of the microlens array on a curved substrate, FIG. 21e the arrangement of two microlens arrays on two surfaces of a body, e.g. a prism, which are not parallel to each other, FIG. 21f the arrangement of two substrates with planar microlens array disposed respectively thereon, the substrates being at a spacing relative to each other and the intermediate space being filled with air or a transparent material, FIG. 21g the arrangement of two microlens arrays on a planar and a curved surface of a solid body, FIG. 21h the arrangement of a microlens array on a body with curved surfaces and of a second planar microlens array on a planar substrate with parallel surfaces, FIG. 21i an arrangement comprising three microlens arrays, a planar substrate with parallel surfaces being provided on both surfaces with microlens arrays and a further microlens array being disposed on a further planar substrate with parallel surfaces, FIG. 21j an arrangement comprising three microlens arrays, a solid body with a curved and a planar surface on these being provided with a curved and a flat microlens array and a further microlens array being disposed on a planar substrate with parallel surfaces.

FIG. 21l an arrangement comprising three microlens arrays, a first microlens array being disposed on a substrate with a curved surface, and also two planar microlens arrays on respectively one planar substrate with parallel surfaces.

The invention claimed is:

1. A device for the homogenisation of radiation or light, comprising at least one lens arrangement which has a large number of lens systems disposed with parallel optical axes, the lens systems being at least partially non-identical and the non-identical lens systems having respectively a same numerical aperture in a first direction parallel to a main plane of the lens systems.

2. The device according to claim 1, wherein the non-identical lens systems have the same numerical aperture in a second direction perpendicular to the first direction and/or in that the numerical aperture of the non-identical lens systems is the same in the second direction as in the first direction.

3. The device according to claim 1, wherein a focal distance and/or dimensions and/or a radius of curvature and/or a free diameter and/or a vertex position of the lens systems is determined by a function which is dependent upon a position of the lens system in the lens arrangement.

4. The device according to claim 1, wherein the at least one lens arrangement is a first microlens array, the lens systems are microlenses, and the microlenses are disposed on one surface.

5. The device according to claim 4, wherein, in addition to a first microlens array, a second microlens array which has a large number of microlenses disposed with parallel optical axes is disposed such that the optical axes of the microlenses of the first microlens array pass through the microlenses of the second microlens array.

6. The device according to claim 4, wherein the surface of the first and/or the second microlens array is planar, spherical, aspherical, toroidal or a freely-formed surface.

7. The device according to claim 5, wherein the microlenses of the second microlens array are disposed on one surface.

8. The device according to claim 5, wherein, on an optical axis of each microlens of the first microlens array, a microlens of the same focal length of the second microlens array is disposed such that the optical axis of the respective microlens of the second microlens array is situated parallel to the optical axis of the corresponding microlens of the first microlens array and spacing between the corresponding microlenses is equal to their focal distance.

9. The device according to claim 8, wherein the optical axes of the microlenses of the second microlens array coincide with the optical axes of the corresponding microlenses of the first microlens array.

10. The device according to claim 8, wherein the microlenses of the second microlens array are displaced relative to the corresponding microlenses of the first microlens array in a lens plane of the microlens of the second microlens array such that light which impinges parallel to the optical axis on a microlens of the first microlens array is deflected by a corresponding microlens of the second microlens array such that it illuminates the same region for all microlenses of the first microlens array at a specific spacing from the second microlens array.

11. The device according to claim 5, wherein the microlenses of adjacent microlens arrays are accommodated respectively on one side on a substrate comprising a transparent material, a glass material, or a polymer material.

12. The device according to claim 11, wherein the substrates are at a spacing relative to each other, and an intermediate space is filled with air or a transparent material.

13. The device according to claim 5, wherein the microlenses of a last microlens array in a direction of a beam path are disposed in the vicinity of, but not exactly in the focus of, the microlenses or lens systems situated in front thereof.

14. The device according to claim 5, wherein a Fourier lens is disposed in a direction of the beam path behind the lens arrangement with a lens plane parallel to the main planes of the lens systems such that the optical axes of the lens systems pass through the Fourier lens.

15. The device according to claim 5, wherein a Fourier lens is disposed behind the second microlens array on the side thereof orientated away from the first microlens array with the lens plane parallel to the lens planes of the microlenses of the first microlens array such that the optical axes of the microlenses of the second microlens array pass through the Fourier lens.

16. The device according to claim 1, wherein the lens systems, respectively disposed in succession in a beam path, have a first and a second microlens, the optical axes of which coincide, the first lenses forming a first microlens array and the second lenses forming a second microlens array and a third microlens array having a large number of microlenses being disposed on a side of the second microlens array orientated away from the first microlens array, such that optical axes of the lens systems pass through the third microlens array.

17. The device according to claim 16, wherein a microlens of the third microlens array is disposed on the optical axis of each lens system such that the optical axis of the respective microlens of the third microlens array is situated parallel to the optical axis of the corresponding lens system, the microlens of the third microlens system being disposed with the main plane thereof in a focus of the corresponding lens system.

18. The device according to claim 17, wherein the optical axes of the microlenses of the third microlens array coincide with the optical axes of the corresponding lens systems.

19. The device according to claim 17, wherein the optical axes of the microlenses of the third microlens array are displaced relative to the optical axes of the corresponding lens systems such that light beams which impinge along the optical axis of a lens system on the respective lens system are deflected by the corresponding microlens of the third microlens array to a point common to all lens systems.

20. The device according to claim 16, wherein a Fourier lens is disposed in the direction of the beam path behind the third microlens array on the side orientated away from the lens arrangement with the lens plane parallel to the lens planes of the microlenses of the first microlens array such that the optical axes of the microlenses of the third microlens array pass through the Fourier lens.

21. The device according to claim 20, wherein the microlens arrays in a plane parallel to the lens plane of the Fourier lens can be displaced together and the Fourier lens is stationary.

22. The device according to claim 16, wherein the second and the third microlens array respectively have at least one cylindrical lens, the cylindrical lens of the second and/or third microlens array being disposed on the optical axis of the cylindrical lens of the first microlens array with a parallel optical axis and being rotated in the lens plane thereof by an angle relative to the cylindrical lens of the first microlens array.

23. The device according to claim 1, wherein the microlenses of two adjacent microlens arrays are accommodated on surfaces of a body which are situated in succession in a beam path, said body comprising a transparent material, in particular glass or a transparent polymer.

24. The device according to claim 23, wherein the body is a prism or a body with a rectangular cross-section.

25. The device according to claim 1, wherein the device can be displaced in a direction parallel to the plane of the first microlens array relative to incident radiation.

26. The device according to claim 1, wherein at least a part of the microlenses at least of one microlens array are axially symmetrical about their optical axis and/or have a circular circumference in the plane of the microlens array.

27. The device according to claim 1, wherein at least a part of the microlenses at least of one microlens array are lenses which are axially symmetrical about their optical axis, and have a rectangular edge in the plane of the microlens array.

28. The device according to claim 27, wherein at least a part of the lenses which are axially symmetrical about their optical axis have a square edge in the plane of the microlens array.

29. The device according to claim 1, wherein at least a part of the microlenses are anamorphic and/or elliptical lenses.

30. The device according to claim 29, wherein at least a part of the anamorphic or elliptical microlenses at least of one microlens array have rectangular edges in the plane of the microlens array.

31. The device according to claim 30, wherein at least a part of the anamorphic or elliptical microlenses at least of one microlens array have square edges in the plane of the microlens array.

32. The device according to claim 1, wherein at least a part of the microlenses at least of one microlens array are cylindrical lenses.

33. The device according to claim 32, wherein at least a part of the cylindrical lenses at least of one microlens array has a constant focal distance along a cylinder axis.

34. The device according to claim 32, wherein a focal distance at least of one cylindrical lens is not constant along a cylinder axis and/or changes continuously along the cylinder axis.

35. The device according to claim 32, wherein the edges of the cylindrical lenses extend parallel to each other.

36. The device according to claim 32, wherein a length of the cylindrical lenses is equal to the extension of the microlens array in the direction of the cylinder axes.

37. The device according to claim 32, wherein a similarly constructed device is disposed in a beam path behind the device such that the optical axes of the microlenses of a rearmost microlens array, in a direction of the beam path, of a front device pass through a foremost microlens array, in the direction of the beam path, of a rear device and extend parallel to the optical axes of the microlenses of a foremost microlens array of the rear device, the rear device being rotated relative to the front device by 90° about the direction of the optical axes.

38. The device according to claim 1, wherein the microlenses of the same microlens array have at least partially different focal distances.

39. The device according to claim 1, wherein the microlenses at least of one microlens array are disposed such that all the microlenses or lens systems in one direction have the same focal distance and, in a direction perpendicular thereto, their focal distance increases or reduces monotonically from one edge of the microlens array or lens arrangement to the other edge.

40. The device according to claim 1, wherein the ratio of the surface, covered by microlenses, at least of one microlens array to the total surface of the corresponding microlens array is maximum for given microlenses.

41. A method, comprising homogenising radiation using the device according to claim 1.

42. A method for the homogenisation of radiation, characterised in that the radiation is deflected to a microlens array with a large number of microlenses disposed with parallel optical axes, the microlenses being at least partially non-identical and the non-identical microlenses having a same numerical aperture.

* * * * *